United States Patent [19]
Robinson

[11] 4,083,673
[45] Apr. 11, 1978

[54] PORTABLE HEATING APPARATUS

[75] Inventor: Ralph C. Robinson, Charlotte, N.C.

[73] Assignee: General Time Corporation, Thomaston, Conn.

[21] Appl. No.: 685,322

[22] Filed: May 11, 1976

[51] Int. Cl.² .............................................. F23N 5/22
[52] U.S. Cl. .................................. 431/87; 237/12.3 C; 431/328
[58] Field of Search .................... 237/12.3 C, 2 A, 81; 126/92 R, 92 AC, 92 B; 431/328, 329, 87; 236/46 C, 46 E

[56] References Cited

U.S. PATENT DOCUMENTS

| | | | |
|---|---|---|---|
| 2,495,857 | 1/1950 | Massare | 431/87 X |
| 2,819,373 | 1/1958 | Allman | 219/202 |
| 3,221,138 | 11/1965 | Hercher | 219/202 X |
| 3,291,199 | 12/1966 | Gutzeit | 237/2 A |
| 3,877,639 | 4/1975 | Wilson | 237/12.3 C |

Primary Examiner—William E. Wayner
Assistant Examiner—William E. Tapolcai, Jr.
Attorney, Agent, or Firm—Pennie & Edmonds

[57] ABSTRACT

A portable heating apparatus includes a catalytic bed, a fuel for the catalyst and an electrical circuit operative at a preset time and throughout a predetermined duration of time for igniting the fuel. The circuit includes a transducer in the form of a resistive heating element connected to a source of power and a pair of switches, all arranged in series with the power source. One switch comprises a motor driven time indicator and the other switch comprises a timer which is manually latched closed and automatically unlatched upon closure of the time indicator. The duration of time during which the latter switch remains closed after unlatching may be adjusted.

5 Claims, 3 Drawing Figures

PORTABLE HEATING APPARATUS

BACKGROUND OF THE INVENTION

The present invention relates to a heating system whose heating cycle may be initiated at a preset time by automatic means for purposes of heating a confined space, such as the interior of an automobile or any other area which normally is not supplied with heat, yet an area which for the comfort of an individual entering the same may be heated shortly prior to the planned arrival of the person. Particularly, the automatic heating system may be in the form of a portable unit received within the confines of the area and may include an independent source of power, i.e., independent from an external electrical system such as that of the automobile or the conventional current mains of a home or office, etc., a transducer in the form of a resistive element, a catalytic heater activated by the heating element, and a circuit electrically connecting the heating element and power source. The automatic heating system also includes means in the circuit opening and closing the electrical connections. Thus, at a predetermined period of time and over a predetermined interval of time the heating element in the form of a glow plug will be energized for commencing heating of the fuel and catalyst, for catalytic action.

Car heaters having means for automatically initiating operation are known to the prior art. Representative heating arrangements of this type are illustrated and disclosed in U.S. Pat. Nos. 2,819,373 3,221,138 and 3,673,379 which issued to R. D. Allman, W. D. Hercher and R. F. Eversull, respectively.

Referring to the prior art heating arrangements, it is to be noted that each utilizes external power for energization of a heating element of the heater. The heating element may either be a separate component or may comprise portions of the automobile cooling system. The source of external power is the conventional current mains and the connection is made by means of an extension cord between the building, such as a home, and a connector carried by the automobile. Thus, for example, in Allman the extension cord connects at a terminal supported in the vicinity of the grill. In Hercher, the connection is made at a plug at the end of a cord which may be pulled forwardly of the automobile against a resilient bias of a spring so that the cord when not in use retracts rearwardly of the automobile. All of the heating arrangements may be initiated at a preset time and the confined area of the automobile will be heated forever so long as the electrical connection is completed to the current mains. In both Allman and Eversull the vehicle battery is also utilized for purproses of energizing, for example, a fan.

The prior art represented by the aforediscussed patents suffers from various disadvantages. Among these are the lack of portability of the heater unit, the requirement of external power and the manner of connection of power to the same. As indicated, the power connection is through an extension cord which very possibly through inadvertence, haste, or any other reason, may not be disconnected from the automobile when it is driven. Various detrimental possibilities can readily be imagined if this were to occur. Also, as may be appreciated there is significant power drain and significant expense attendant to electrical heating. Importantly, however, the prior art systems are unworkable except when there is ready access to external power.

BRIEF DISCUSSION OF THE INVENTION

The present invention is an improvement over heating arrangements of the prior art as generally described above. To this end, the heating apparatus is in the form of a portable unit having its own power source for energizing a heating element which, in turn, initiates a catalytic reaction. The reaction is both endothermic and exothermic and one which continues until terminated. The power source may be a direct current source supplied by a battery. The power circuit to the heating element which may be formed by a glow plug includes a pair of series arranged switches, one of which controls the time following which initiation of the reaction may occur. This switch may be incorporated in a clock device which is driven continuously by a motor. The motor may be a low power synchronous type adapted to be driven by the battery. Motors of this type are well known and if its power requirements are low, the battery may provide operation over an extended period of time without replacement. The battery, also may be of the type capable of being recharged, as required.

The second switch of the type to be manually closed comprises a time delay mechanism which, once set, may be tripped automatically upon closure of the first switch. Thus, following the period of time delay the second switch will open to open the circuit to the heating element. In this manner, the drain on the battery will be only that resulting from operation of the motor. The period of the time delay will be chosen thereby to be of sufficient duration to initiate the catalytic reaction, which because of its nature continues until terminated irrespective of whether the heating element remains activated.

The present invention, as may now be apparent has the advantage of providing heat to a confined area such as an automobile for immediate comfort of the driver on entering on those occasions when the automobile has been standing for a long period of time in a cold weather environment. This advantage may be realized even if the automobile is located in a remote area. Further, the heating arrangement of the present invention provides heat to the confined area with less electrical power drain than is possible with the prior art as represented above. Other objects and advantages of the present invention will become apparent to those skilled in the art as the disclosure to be read in conjunction with the figures of drawing continues.

DESCRIPTION OF THE PREFERRED EMBODIMENT

Figure 1:
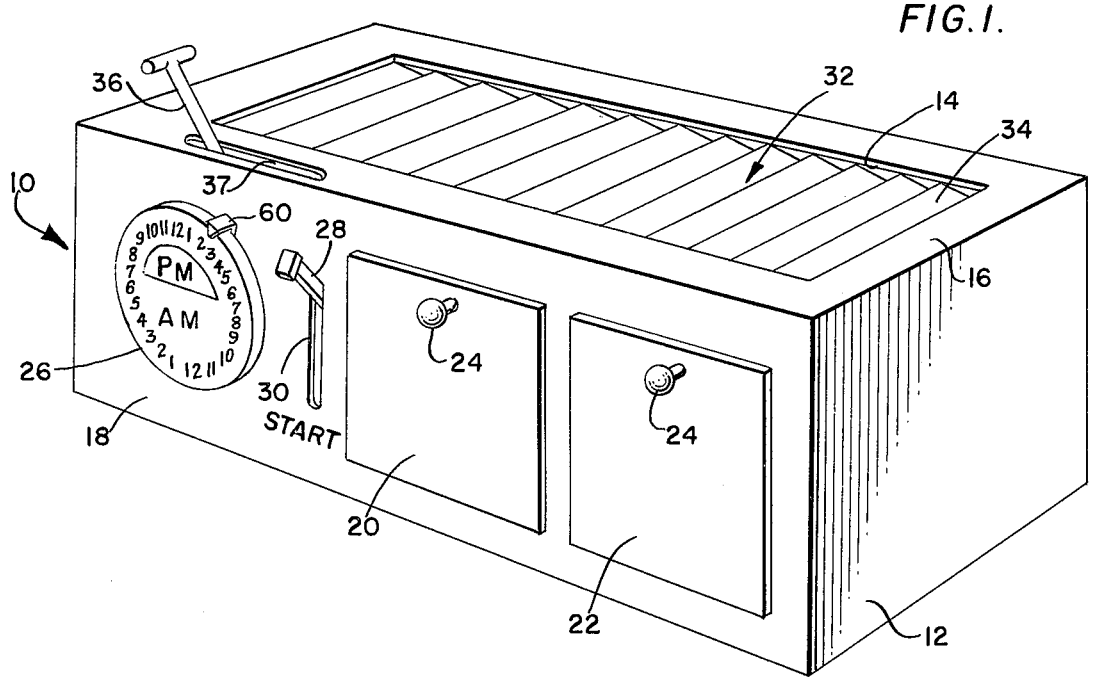
FIG. 1 is a view in perspective of a portable unit in which the heating arrangement of the present invention is housed.

The heating arrangement 10 of the present invention may be contained in a housing 12 which is readily portable from one location to another as by a pair of handles or other conventional structure (not shown) capable of being gripped. The housing may be of any outline and provides an opening 14 to the interior through one of the walls, such as a top wall 16. Another wall, such as front wall 18 also includes a pair of openings to the interior, both being closed by a door. A door 20 closes a chamber for the electrical circuit and a door 22 closes a chamber within which is disposed a replenishable source of fuel. A knob 24 opposite the hinge (not shown) on each door is provided for opening purposes.

A clock disc 26 with hour indicia throughout a 24-hour period is supported through the front wall 18. Additionally, a lever arm 28 extends through the front wall for movement in a slot 30 between the position of FIG. 1 to a position identified as ∓START", for purposes as will be described.

The housing may be formed of any suitable material, preferably one which is light-weight, and provides structural stability, among other features or characteristics. For purposes herein the housing may be formed of aluminum. A conventional type of insulation preferably will be supported by the interior walls of the housing surrounding the heating area. In this manner, the delivery of heat will be substantially localized to the opening 14. A shutter 32 which may be a slidable plate or which may include a plurality of louvers 34, each of which is ganged to adjacent louvers for movement, is supported within the opening. A handle 36 movable along a slot 37 controls movement of the louvers between a closed position and positions of partial to full opening.

Figure 2:
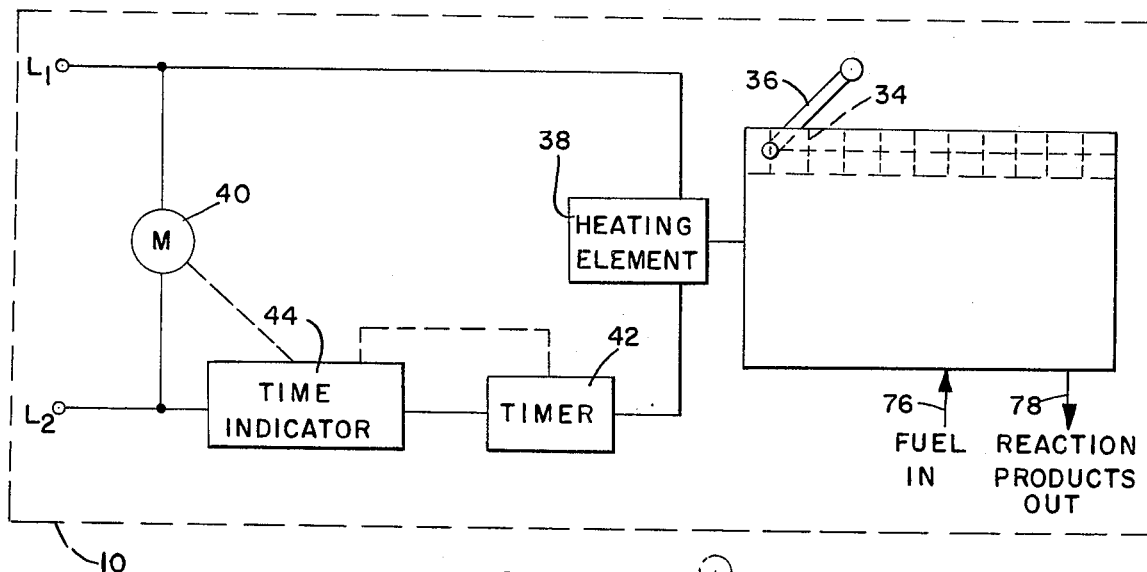
FIG. 2 is a block representation of the heating arrangement.

The electrical circuit is represented in block form in FIG. 2. A source of power which may be a conventional battery is provided across lines $L_1$–$L_2$. As indicated, the electrical circuit has low power requirements and, accordingly, it has been found that the battery may comprise a conventional power cell having a voltage of 1.5v to 3.0v DC or more as determined by motor operation and the power drain on the electrical circuit. A heating element 38 and a motor 40 are connected across the circuit and first and second switches 42, 44 are in series with the heating element. The heating element may be a glow plug of a type commonly used with motors of model airplanes or model airplane types.

The first switch is indicated in the figure as a "TIMER", while the second switch is indicated as a "TIME INDICATOR".

Figure 3:
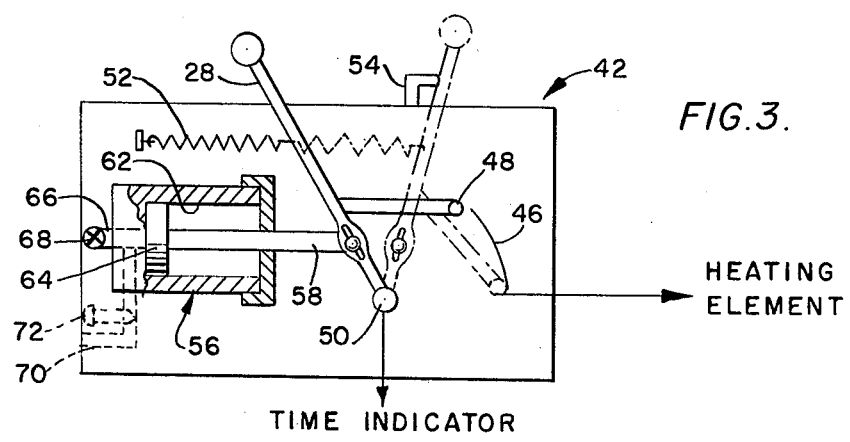
FIG. 3 is a schematic representation of one of the switches of the electrical system.

The switch 42 may be seen to best advantage in FIG. 3. The switch includes a contact strip 46 electrically connected to the heating element 38 and a brush 48, carried by lever 28, and electrically connected to switch 44 through a terminal at the pivot 50 of the lever. The lever is movable to the dotted line position in the figure against the bias of spring 52 so that the brush is in contact with the contact strip. A latch 54 retains the lever in the dotted line position. The rod 58 of a dashpot device 56 is connected to the lever for purposes as will be set out. Any form of a mechanical timer may be used, also.

The switch 44 may be of the type including a motor 40 of the low power synchronous type for driving the dial 26. The switch also includes a pair of contacts (not shown) which will close at the time, either day or night, as set by the member 60 which is adjustable on the dial 26. The driving connection between the motor and the dial of the switch is illustrated by the dotted line in FIG. 2 thereby to drive the dial continuously.

In operation, the lever 28 of the switch 42 is moved manually to and latched at the dotted line position of FIG. 3 thereby to close the switch through the contact strip 46 and brush 48. This action "arms" the heating system so that at the time preselected on dial 26 and upon closure of the switch 44 power from the source will energize the heating element 38. The heating element, indicated as being formed by a glow plug, positioned in the vicinity of the catalyst, initiates the catalysis process by its generation of heat. During the heating cycle the louvers 34 of slide plate of the shutter 32 will be positioned thereby to determine the amount of heat radiation through opening 14 to the confined area. If the louvers or slide plate is contolled, an area of the catalytic heater to be used may be determined.

The switch 42 will remain closed for a predetermined duration of time, at which it opens to open the circuit to the heating element. Turning again to FIG. 3, it is seen that the period of time during which the switch remains closed may be determined by control of the dashpot device 56. Thus, when the lever 28, against the bias of spring 52, is latched in the dotted line position the cylinder 62 behind piston 64 is pressurized. To this end, the cylinder is in communication with the atmosphere through the conduit 66. A one-way valve 68 permits rapid passage of fluid into the cylinder. A conduit 70, also in communication with the cylinder, provides passage of fluid from the cylinder as the lever, following an unlatching operation, returns to the full line position in FIG. 3. A needle valve 72 is threadedly received into conduit 70 and through adjustment determines the volume of fluid/unit time to be metered and consequently the speed of movement of the lever 28 in the counter-clockwise direction. The switch may maintain the circuit to the heating element 38 closed for a period of from a few seconds to several minutes or more. Preferably, the circuit will be closed for about 15–20 seconds which has been found adequate for necessary heating of the glow plug to initiate the catalytic action.

The time delay period follows actuation of the switch 44. To this end, switch 44 provides a release (indicated by the dotted line connection in FIG. 2) for automatic releasing of the latch 54. The switch 44 will remain closed for a period of time in excess of the delay period and then will open to permit resetting of the heating arrangement for a subsequent cycle of operation which will commence at the time set thereafter.

The catalytic heater may comprise a series of catalyst containing means or bed which typically may be formed by platinum such as a commercially available wire mesh or platinum metal sol coated on a carrier of expanded aluminum oxide or aluminum silicate, the latter being known as and sold under the tradename "Torvex". The fuel may be alcohol or some other hydrocarbon, such as unleaded gasoline. The source of fuel preferably will be provided within the housing and include conventional means (not shown) for metering and the commencement of metering of the fuel to and over the surface of the catalyst bed. The heat generated by the glow plug will ignite the fuel in the presence of the catalyst in the catalytic heater. By maintaining current through the glow plug for the period during which the switch 42 remains closed ignition will be ensured. Thereafter, the heat of reaction will provide continuous catalytic operation which may be terminated by closing the shutter 32. Conventional means (not shown) are provided for passing the reaction products from the housing. The fuel inlet and outlet are represented by the arrows 76, 78 in FIG. 2.

Having described the invention with particular reference to the preferred form thereof, it will be obvious to those skilled in the art to which the invention pertains after understanding the invention, that vaious changes and modifications may be made therein without departing from the spirit and scope of the invention as defined by the claims appended hereto.

Having described the invention, what is claimed is:

1. An automatic heating system for heating a confined area comprising, in combination:
    (a) housing means;
    (b) catalytic means including a catalyst disposed in said housing means;
    (c) means providing a fuel for reaction with said catalyst;
    (d) means initating an exothermic reaction of said fuel in the presence of said catalyst, said initating means including
        (1) a heating element for initiating said reaction;
        (2) a source of power,
        (3) means connecting said power source and said heating element, and
        (4) means in series with said heating element for energizing said heating element at a predetermined time and over a predetermined period of time; and
    (e) shutter means for opening and closing said housing to ambient conditions whereby said exothermic reaction will continue for a period of time during which said shutter means remains open.

2. The automatic heating system of claim 1 wherein said automatic heating system is self-contained and said source of power is included within the system.

3. The automatic heating system of claim 1 wherein said means providing fuel for said reaction includes a source of fuel, means communicating said fuel to said catalyst, and said automatic system including means for passing products of reaction from said housing.

4. The automatic heating system of claim 1 wherein said means in said connecting means includes a pair of series arranged switches, one of said switches controlling the time of activation of and the other of said switches controlling the period of time over which said heating element is connected to said source of power.

5. The automatic heating system of claim 4 including a prime mover, means mechanically connecting said prime mover to said one switch.

* * * * *